C. MEINERS.
Mechanical Movements.

No. 138,424. Patented April 29, 1873.

WITNESSES.

INVENTOR.

UNITED STATES PATENT OFFICE.

CORNELIUS MEINERS, OF INDIANAPOLIS, INDIANA.

IMPROVEMENT IN MECHANICAL MOVEMENTS.

Specification forming part of Letters Patent No. 138,424, dated April 29, 1873; application filed April 15, 1873.

*To all whom it may concern:*

Be it known that I, CORNELIUS MEINERS, of Indianapolis, in the county of Marion and State of Indiana, have invented certain new and useful Improvements in Mechanical Movements; and I do hereby declare the following to be a full, clear, and exact description of the invention, such as will enable others skilled in the art to which it pertains to make and use it, reference being had to the accompanying drawing which forms part of this specification.

The nature of my invention relates to an improvement in devices for converting reciprocating into rotary motion; and it consists in the arrangement and combination of parts, which will be more fully described hereafter.

Figure 1:
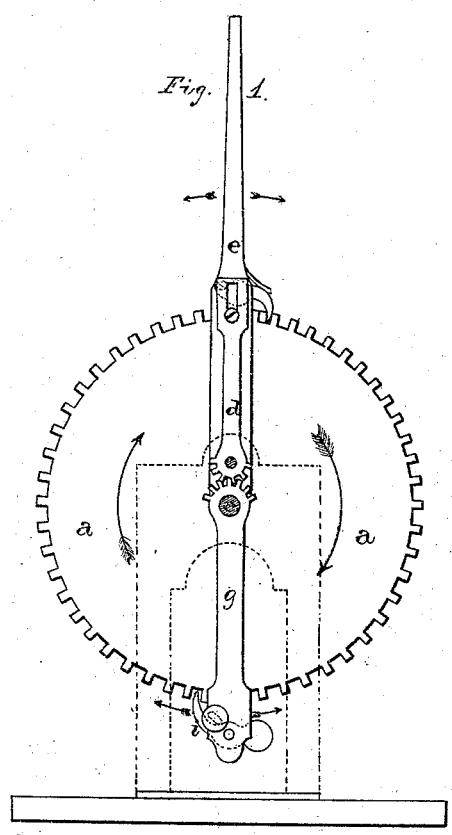
Figure 2:

Figure 1 is a side elevation of my invention; and Fig. 2 is detail view of one of the dogs, showing the manner of moving it out of gear.

$a$ represents a toothed wheel secured to the shaft $c$. Pivoted to this shaft is the lever $e$, having a spring-dog pivoted to its side which catches in the teeth of the wheel and moves it forward. Just above the shaft is pivoted a lever, $d$, having its upper end slotted and secured to the side of the lever $e$, while its lower end describes a semicircle and is provided with cogs so as to mesh with the teeth formed on the lever $g$. This lever $g$ is pivoted on the shaft, and has a dog, $i$, secured to its lower end which engages with the teeth of the wheel $a$ and moves it forward the instant the dog on the lever $e$ ceases, so that the action of the wheel is continuous.

By operating the lever $e$ back and forth it operates the levers $d$ $g$ at the same time, the lever $g$ always moving in the same direction as the lever $e$, and as soon as one dog releases its hold the other takes it up, so that whether the lever is moving forward or back the wheel is constantly being urged forward.

Both of the dogs are provided with suitable devices for moving them out of contact with the teeth of the wheel $a$, so that the levers may be moved back and forth without affecting it.

Having thus described my invention, what I claim as new, and desire to secure by Letters Patent, is—

1. The handle or lever $e$, in combination with the two levers $d$ $g$ having their ends geared together, as shown, dogs $i$, and wheel $a$, substantially as set forth.

2. In combination with the dogs $i$, a device for moving them out of gear, substantially as shown and described.

In testimony that I claim the foregoing I have hereunto set my hand this 11th day of April, 1873.

CORNELIUS MEINERS.

Witnesses:
G. S. WRIGHT,
CARLIN HAMLIN.